April 14, 1953 — J. F. SHIRK — 2,635,022
PISTON RING ASSEMBLY
Filed June 20, 1950 — 5 Sheets-Sheet 4

INVENTOR.
John F. Shirk,
BY Davis, Lindsey, Hibben + Noyes
Atty's

April 14, 1953　　　　J. F. SHIRK　　　　2,635,022
PISTON RING ASSEMBLY

Filed June 20, 1950　　　　　　　　　　5 Sheets-Sheet 5

INVENTOR.
John F. Shirk,
BY
Davis, Lindsey, Hibben & Noyes
Atty's.

Patented Apr. 14, 1953

2,635,022

UNITED STATES PATENT OFFICE 2,635,022

PISTON RING ASSEMBLY

John F. Shirk, Hagerstown, Ind., assignor to Perfect Circle Corporation, Hagerstown, Ind., a corporation of Indiana Application June 20, 1950, Serial No. 169,095

28 Claims. (Cl. 309—45)

The invention relates generally to piston rings and more particularly to an oil ring for an internal combustion engine.

The general object of the invention is to provide a piston ring assembly comprising rail structure and a novel expander and spacer member which exerts an expanding force on the rail structure at a relatively large number of points so that the rail structure is caused to bear against the cylinder uniformly throughout its circumference.

Another object is to provide a novel piston ring assembly comprising a rail structure and a combined spacer and expander which is self-expanding and thus does not require support by the back of the groove in the piston to exert the expanding force on the rail structure, this feature thereby permitting the ring assembly to be used with grooves of different depths.

A further object is to provide a novel piston ring assembly comprising a rail structure and a combined spacer and expander which has relatively large openings therethrough and which is completely out of contact with the back of the ring groove so that oil collected by the rail structure will be freely drained inwardly in the groove and through the drain holes normally provided at the back of the groove.

Still another object is to provide a novel piston ring assembly comprising a combined spacer and expander adapted to cooperate with a rail structure, which may be easily and inexpensively manufactured.

A still further object is to provide a novel piston ring assembly comprising a pair of rails and a circumferentially expansible combined spacer and expander element for holding the rails axially spaced and for expanding the rails radially, with the surfaces of said element which bear against the rails shaped so as to readily slide on the rails in expanding.

Other objects and advantages will become apparent from the following description taken in connection with the accompanying drawings, in which.

Piston ring assemblies of the type comprising one or two radially expansible rails and means for positioning the rails in the ring groove in the piston and for expanding the rails have been found to be quite satisfactory for oil control in internal combustion engines. However, in ring assemblies of this type that have heretofore been commercially available, two principal difficulties have been encountered. The means for expanding the rails radially is usually in the form of a so-called hump spring which is provided with certain circumferentially spaced portions engaging the back of the ring groove and intervening circumferentially spaced portions which engage the rail or rails, as the case may be. The first difficulty resulting from such construction of the expanding means is that the expansive force exerted on the rail or rails occurs at definite points which are circumferentially spaced so that uniform bearing of the rails against the cylinder wall cannot be obtained. The pressure being exerted at such definite circumferentially spaced points creates undue pressure at such points with a lack of sufficient pressure at intervening points, and excessive wear may occur both on the rails and on the cylinder wall at the points where the pressure is exerted.

The other difficulty arises from the fact that the means for expanding the rails must bear against the back of the groove in order to exert outward or radial pressure. There is no standard depth for such grooves and, consequently, if the groove is relatively shallow, an excessive pressure will be exerted, and if the groove is relatively deep, then the pressure on the rails may not be sufficient. Piston ring manufacturers have attempted to supply expanding means, such as these hump springs, which are dimensioned for grooves of different depths, but it has been found that piston ring users apparently do not take the trouble to measure the depth of the groove and use a hump spring suited for that particular depth. Moreover, it creates a difficulty for the manufacturer in that either hump springs for the different depths or rails of different radial dimension have to be provided.

The present ring assembly avoids these difficulties by providing a combined expander and positioning member which is self-expansible and does not rely on abutment with the back of the ring groove to exert an outward or radial pressure on the rail or rails. Thus, such ring assembly may be used with different groove depths so long as they are of sufficient depth to accommodate the assembly. This results in producing a ring assembly in which the outward pressure on the rail structure is uniform, regardless of the depth of the groove, and it simplifies the problem for the manufacturer since different expanding means do not have to be supplied to accommodate grooves of different depths.

The self-expanding combined expander and positioning member is also constructed so that it bears outwardly on the rail structure substantially throughout its entire circumference, and not merely at circumferentially spaced points, so that uniform expansion of the rail structure occurs and no undue wear takes place at certain points around the periphery of the ring. More uniform oil control is thereby obtained.

In the embodiment of the invention illustrated in Figs. 1 to 5, inclusive, the ring assembly comprises a rail structure in the form of two axially spaced rails 30. The rails 30 are located at the top and bottom of the ring groove of the piston, indicated at 31, and bear outwardly against the surface 32 of the cylinder wall, as is usual in this general type of ring. Each rail 30 is made of a flat strip of metal, such as steel, and is provided with the usual gap to permit it to expand radially. Each rail also is of a resilient character so that by itself it exerts some outward pressure against the cylinder wall.

The ring assembly also includes a combined expander and positioning member which, in the present instance, is of a self-expansible character and bears outwardly against the inner peripheries of the two rails 30 so that adequate pressure against the cylinder wall is exerted by the rails. The self-expansible combined expanding and positioning member is, in the present instance, made from a strip of sheet metal which is resilient in character and is formed to exert an outward pressure against the inner peripheries of the two rails 30 and also acts as a spacer for holding the respective rails at the upper and lower sides of the ring groove. The structure of the self-expanding combined spacer and expander is such that openings are provided therethrough so that oil collected from the cylinder wall by the reciprocation of the rails 30 may freely pass inwardly to the inner portion of the ring groove for drainage back to the crankcase through the usual holes provided in the piston.

Figures 1, 2, 5:
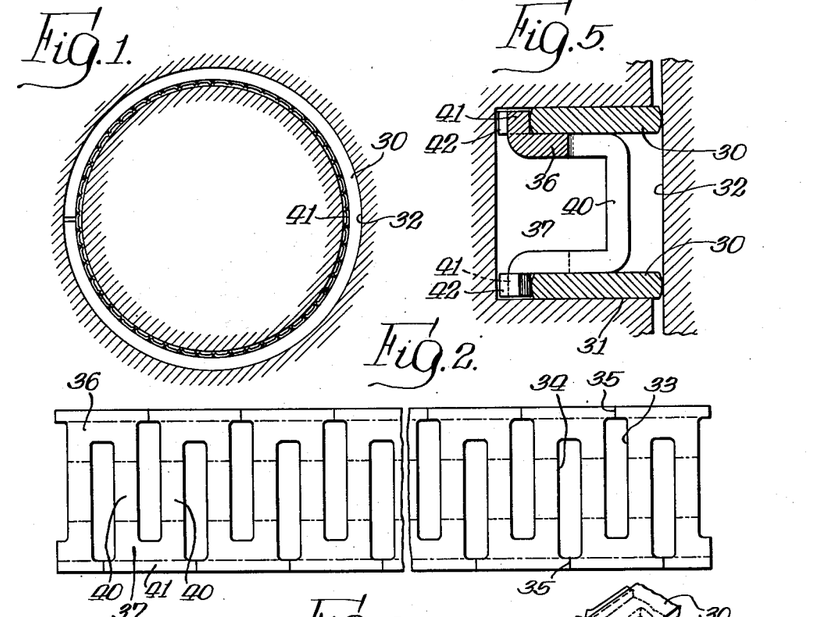
Figure 1 is a fragmentary transverse sectional view indicating a piston and cylinder with the piston provided with a ring assembly embodying the features of the invention.
Fig. 2 is a view of a strip of metal from which a combined expander and positioning member is formed, such member being a part of the ring assembly shown in Fig. 1.
Fig. 5 is an enlarged transverse sectional view taken on the line 5—5 of Fig. 4 and showing the relation of the ring assembly to the piston and the cylinder.
Figure 3:
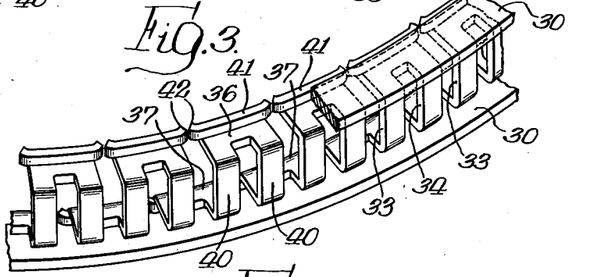
Fig. 3 is a fragmentary perspective view of the ring assembly.
Figure 4:
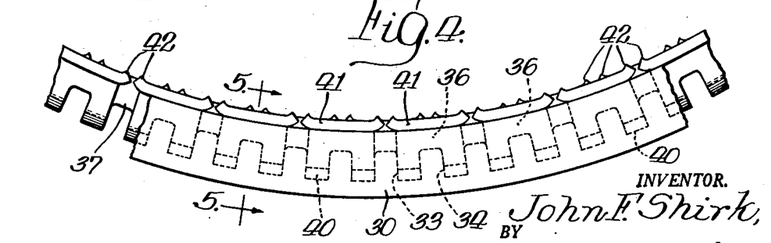
Fig. 4 is a fragmentary plan view of the ring assembly.

The strip of metal from which the combined spacer and expander illustrated in Figs. 1 to 5, inclusive, is made is shown in Fig. 2 and comprises an elongated strip punched with transversely extending slots 33 and 34, the slots 33 and 34 being in staggered relation with each other, as is clearly shown in Fig. 2. One end of the slot 33 is thus located adjacent one edge of the strip, while the other end of the slot is spaced substantially from the opposite edge, and the other slot 34, because of its staggered relation, is located so that one end thereof is adjacent the second-mentioned edge of the strip and its other end is substantially spaced from the first-mentioned edge of the strip. The strip is also provided with slits 35 which extend from the ends of the slots adjacent the side edges of the strip outwardly to such edge so that each of the slots 33 and 34 may be said to open to one edge of the strip.

The strip is then bent along longitudinally extending lines, indicated by the dotted lines in Fig. 2, to form a generally U-shaped cross section, as indicated in Fig. 5. The punching, slitting and bending thus provide two series of segments 36 and 37 located at the top and bottom of the combined spacer and expander with the segments 36 connected to the segments 37 by web members 40. The U-shaped section formed by the segments 36 and 37 and the web members 40 is located between the rails 30 and is dimensioned so that it holds the rails in properly axially spaced relation to each other at the upper and lower sides of the piston ring groove, the segments being positioned adjacent the inner edges of the respective rails 30, with the bent web members 40 extending outwardly between the rails but spaced from the cylinder wall.

Because of the slots 33 and 34 and the slits 35, it will be evident that a circumferentially expansible structure is thereby provided, and the combined expander and spacer member is so dimensioned that when it is installed in a ring groove in a piston with the rails 30, and with the ends of the member in abutment, the combined expander and spacer member tends to expand circumferentially. Such tendency to circumferentially expand is utilized to exert a radially outward expanding force on the rails 30. To this end, each segment 36 or 37 is bent into the form of a right angle with one leg of the angle extending to provide flange portions 41 which engage the inner peripheries of the rails 30. Thus, the flange portions 41 on the upper row of segments 36 engage the inner periphery of the upper rail 30 while the flange portions 41 on the lower row of segments 37 engage the lower rail 30. The entire spacer and expander member is curved to provide a ring shape and the flange portions 41 thus bear outwardly substantially throughout their entire circumferential length against the inner peripheries of the rails.

The ring assembly, when functioning within a cylinder, will expand and contract slightly due to variations in the cylinder diameter. Since the rails 30 expand radially and the combined spacer and expander expand circumferentially, there will be some relative movement between the flanges 41 and the inner peripheries of the rails in a circumferential direction. To facilitate such movement and cause the flanges 41 to slide freely on the inner peripheries of the rails without corner portions of the flanges digging into the rails, the flanges 41 are formed so that the corner portions thereof are bent away from the rails and thus cannot dig into the rails in any way. Because of the difference in width between the slots 33 and 34 on the one hand and the slits 35 on the other hand, each portion of the strip which forms a flange 41 has end portions projecting circumferentially slightly beyond the segments. These end portions are bent inwardly, as indicated at 42 in Fig. 3, with the bend being formed on a curve so that the corners of the flanges 41 which are formed by the slits 35 will not contact the rails. Thus, the flanges 41 are free to slide smoothly against the inner periphery of the rails 30 so that the combined spacer and expander can freely expand circumferentially relative to the rails.

With the foregoing structure, the combined spacer and expander is of a self-expansible construction because of the web members 40 connected by the segments 36 and 37, and since this structure tends to expand circumferentially and thereby increase its diameter, the flanges 41 will bear outwardly against the rails to force them against the cylinder wall with the desired pressure. Because of this construction, the combined spacer and expander in no way relies upon the bottom of the ring groove to exert its expanding force. It thus may be used with a groove of any depth provided there is sufficient depth to accommodate the assembly. The flanges 41 contact substantially the entire length of the rails and thus exert the expanding force uniformly throughout the length of the rails. The segments 36 and 37 together with the web members 40, by their U-shaped form, provide adequate support for holding the rails 30 in axially spaced relation. The slots 33 and 34 between the web members 40 give adequate opening for the flow of oil inwardly as it is collected by the rails 30 during the reciprocation of the piston.

Figure 6:
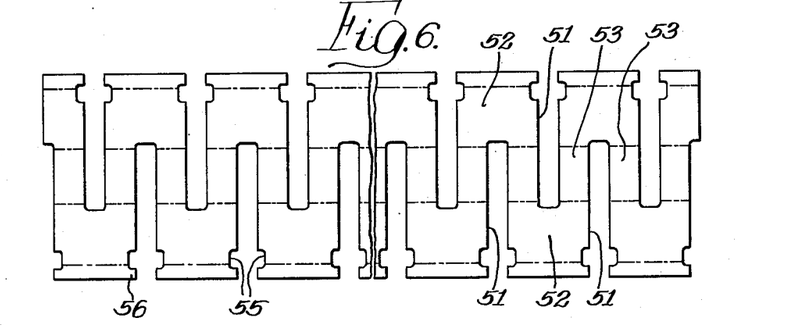
Fig. 6 is a view of a strip of metal from which a modified form of combined expander and positioning member is made.
Figures 7, 8:
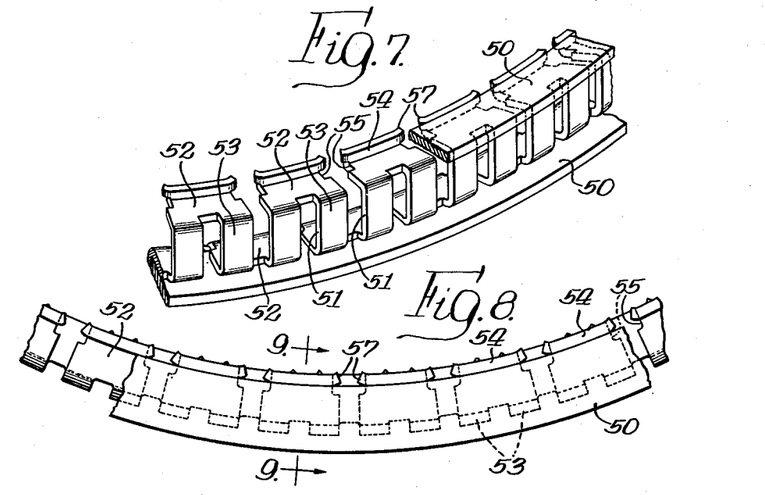
Fig. 7 is a fragmentary perspective view of a ring assembly utilizing the combined expander and positioning member formed from the strip shown in Fig. 6.
Fig. 8 is a fragmentary plan view of the ring assembly shown in Fig. 7.
Figure 9:
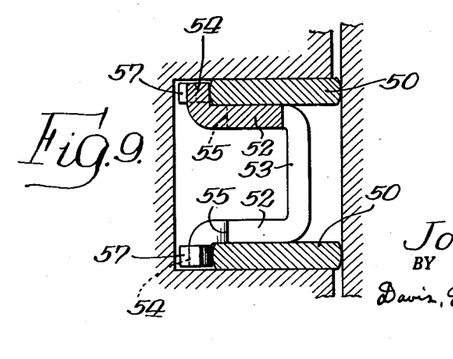
Fig. 9 is an enlarged transverse sectional view taken on the line 9—9 of Fig. 8 and showing the ring assembly in relation to the piston and cylinder.
Figure 10:
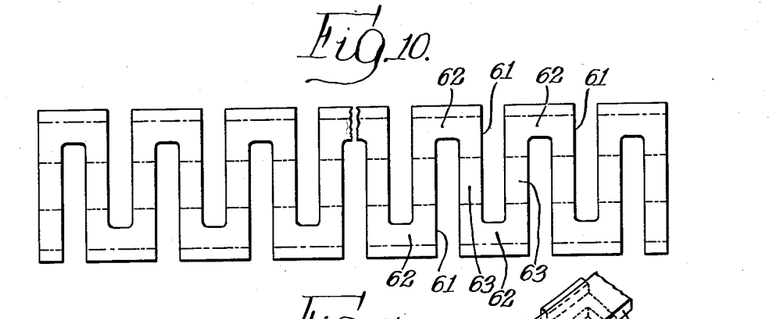
Fig. 10 is a view showing a strip of metal from which another modified form of combined expander and positioning member is made.
Figure 11:
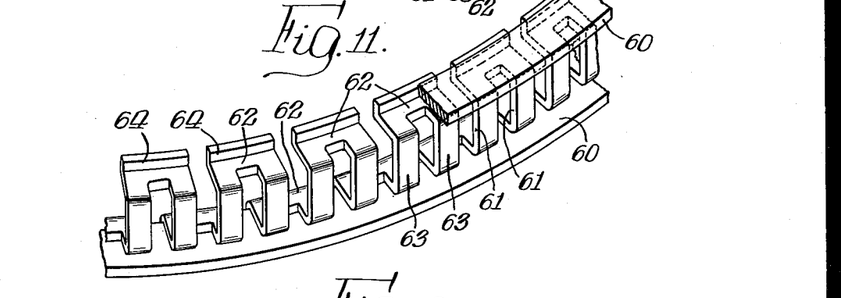
Fig. 11 is a fragmentary perspective view of a ring assembly utilizing the combined expander and positioning member formed from the strip shown in Fig. 10.
Figure 12:
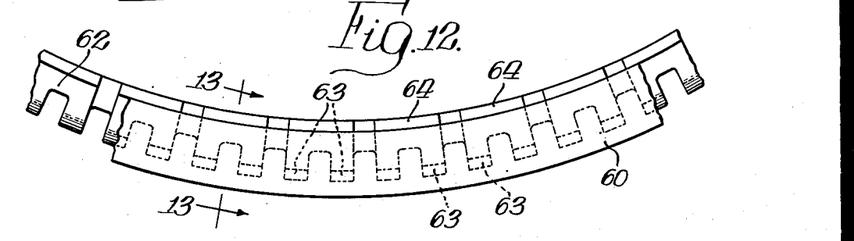
Fig. 12 is a fragmentary plan view of the ring assembly shown in Fig. 11.

In the modified form shown in Figs. 6 to 9, inclusive, a pair of rails 50 are employed, as in the case of the first described form. The self-expanding combined spacer and expander in this instance, however, is of somewhat different construction. It is made from a strip of metal, as in the first form, but it is punched in a different manner, as illustrated in Fig. 6. Thus, the strip is provided with slots 51 extending alternately and inwardly from opposite edges of the strip. The slots 51 extend only slightly beyond the center of the strip and thus provide segments 52 and web members 53. When the strip is bent along longitudinal lines into a generally U-shaped form in cross section, the segments 52 constitute the arms of the U and extend radially, as illustrated in Fig. 9, while the web members 53 constitute the base of the U and extend axially. The web members 53 are shorter than the web members illustrated in the first described form and thus are somewhat stiffer. The U-shaped form of the combined spacer and expander holds the rails 50 in axially spaced relation to each other and provides an expansible structure which is utilized to expand the rails.

The portions of the segments 52 formed by the edge portions of the strip are bent at a right angle to extend axially to form flanges 54 adapted to engage the inner peripheries of the respective rails 50. The flanges 54 will have some movement circumferentially relative to the rails 50, and the corner end edges of the flanges 54 are so formed that they cannot dig into the inner edge of the rails and thus prevent free sliding movement. To this end, notches 55 are cut in the strip to extend circumferentially from each slot 51 adjacent the outer end of the slot at the juncture between the flange 54 and its segment 52. Thus, end portions 56 are formed in the strip, as shown in Fig. 6. The end portions 56 are then bent or curved inwardly, as shown at 57 in Fig. 7, so that the end corners thereof are clear of the rails. The flanges 54 thus may freely slide against the inner peripheries of the rails during expansion and contraction of the ring assembly so that the circumferential expansion of the combined spacer and expander will exert an outward pressure against the rails, urging them into close contact with the cylinder wall.

With this modified form shown in Figs. 6 to 9, inclusive, the combined spacer and expander is self-expansible so that the depth of the groove does not affect the pressure exerted by the combined spacer and expander against the rails. The U-shaped form of the combined spacer and expander holds the rails in axially spaced relation and the expansive force exerted by the combined members provides for adequate bearing of the rails 50 against the cylinder wall. The stiffness of the web members 50, due to the fact that they are shorter in length than those shown in the first-described form, creates a higher pressure of the rails against the cylinder wall than in the case of the first-mentioned form. Furthermore, since the flanges 54 engage the inner peripheries of the rails through substantially the entire length thereof, the rails are uniformly expanded throughout their length and thus exert a uniform pressure against the cylinder wall.

Figure 13:
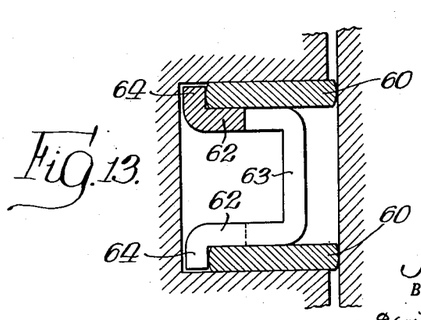
Fig. 13 is an enlarged transverse sectional view taken on the line 13—13 of Fig. 12 and showing the ring assembly in relation to the piston and cylinder.

The modified form shown in Figs. 10, 11, 12 and 13 is somewhat simplified from the earlier described forms but utilizes, as in the other two forms, two rails 60 located at the upper and lower sides of the piston ring groove. The rails 60 are expanded outwardly and held in axially spaced relation by a combined expander and spacer formed from a strip of metal illustrated in Fig. 10. Thus, the strip of metal is provided with slots 61 extending alternately and inwardly from opposite edges of the strip, the slots being of uniform width throughout their length. The strip is then bent along longitudinal lines to provide a U-shaped form in cross section, as illustrated in Fig. 13, which extends between the rails 60 to hold them in axially spaced relation. The slots 61 provide two rows of segments 62 connected by web members 63. This construction provides for circumferential expansion of the combined expander and spacer member.

To permit the combined expander and spacer member to exert its expanding force on the rails 60, the outer portions of the segments 62 formed by the edge portions of the strip are bent at a right angle to extend axially to form flanges 64 to engage the inner peripheries of the rails 60. Due to the circumferential resilience of the combined spacer and expander, the tendency thereof to increase in diameter forces the flanges 64 outwardly against the rails 60 to cause the latter to bear against the cylinder wall. Because of the self-expanding character of the combined spacer and expander, no reliance is placed on the back of the groove to exert the expanding force, and since the flanges 64 bear against the inner periphery of the rails for substantially the entire length thereof, uniform pressure on the rails throughout their length is exerted.

Figure 14:
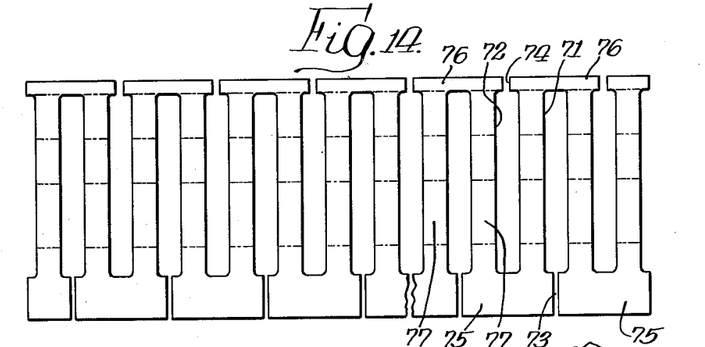
Fig. 14 is a view of a strip of metal from which another modified form of combined expander and positioning member is made.
Figure 15:
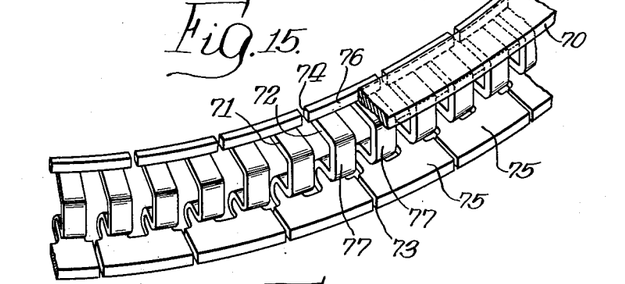
Fig. 15 is a fragmentary perspective view of a ring assembly utilizing the combined expander and positioning member formed from the strip shown in Fig. 14.
Figure 16:
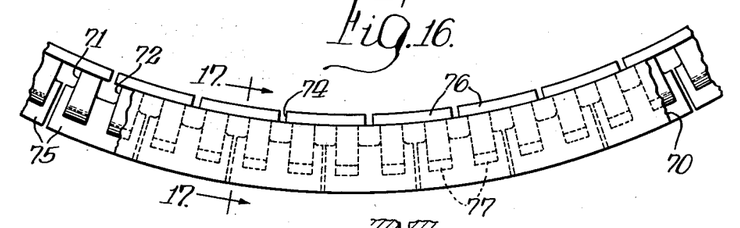
Fig. 16 is a plan view of the ring assembly shown in Fig. 15.

In the modified form shown in Figs. 14, 15, 16 and 17, only one rail, indicated at 70, is employed. The combined positioning and expanding member is arranged to hold the rails 70 at one side of the groove and to exert an expanding force thereon, and is also provided with a row of cylinder-engaging segments at the other side of the groove to cooperate with the rail 70 in controlling the oil condition within the cylinder. In this instance, as in the case of the forms heretofore described, the combined expander and positioning member is formed from a strip of sheet metal and is punched with a plurality of transversely extending slots 71 and 72, as illustrated in Fig. 14. The slots 71 and 72 are coextensive and are located closer to one side of the strip than to the other, as is apparent in this figure. At the end of each slot 71 which is farther from the edge of the strip, a narrower slot 73 is provided so that the slot 71 thus opens to that edge of the strip. Each slot 72, at its end which is nearer the edge of the strip, is provided with a narrower slot 74 which provides an opening from the slot 72 to the edge of the strip.

Figure 17:
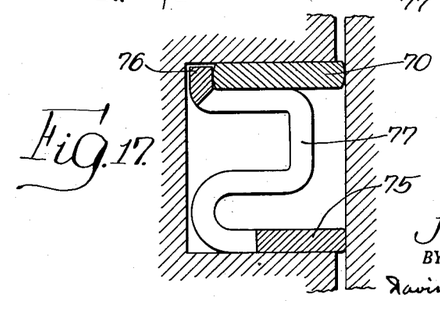
Fig. 17 is an enlarged transverse sectional view taken on the line 17—17 in Fig. 17 and showing the ring assembly in relation to the piston and cylinder.

With this arrangement of slotting, segments 75 of relatively large transverse width are provided, while segments 76 of relatively narrow transverse width are provided, the respective rows of segments obviously being formed by the edge portions of the strip. The segments 75 and 76 are connected by web members 77 lying between the slots 71 and 72. The strip is then folded or bent along longitudinally extending lines into a form which may be described as a reverse S, as illustrated in Fig. 17. Thus, the web members 77 hold the rail 70 at one side of the groove and position the segments 75 at the opposite side of the groove. The segments 75, which are those having the greatest transverse width, thereby constitute a row of cylinder-engaging segments cooperating with the rail 70 to control the oil conditions in the cylinder.

The combined expanding and positioning member, because of its construction comprising the segments connected by web members, will tend to expand circumferentially when located in the cylinder to hold the segments 75 in engagement with the cylinder wall. The segments 76 are located to engage the rails 70 and, to this end, are bent to extend in an axial direction to bear against the inner periphery of the rail. The circumferential expansibility of the member exerts an outward force through the segments 76 against the rail 70 to cause the latter to bear against the cylinder wall with the desired pressure. It is obvious that, in this form, as in the previously described forms, the combined expander and positioning member does not bear against the back of the groove and thus does not depend on such bearing to exert an expanding force on the rail 70.

In the ring assembly shown in Figs. 18, 19, 20 and 21, two rails 80 are employed, as in the case of the first three forms, with the rails located at opposite sides of the piston ring groove. Between the rails is a combined spacer and expander which is of somewhat different form from those heretofore illustrated, but which is self-expansible so as not to rely on bearing against the back of the groove to exert outward pressure on the rails 80.

Figure 18:
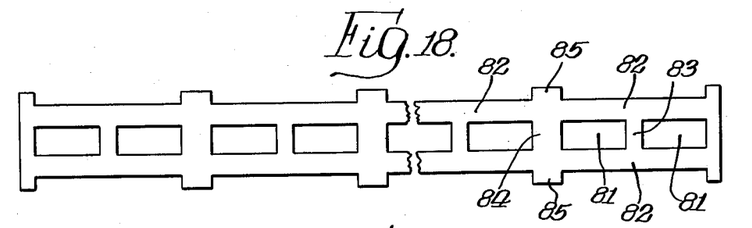
Fig. 18 is a view of a strip of metal from which a further modified form of combined expander and positioning member is made.
Figure 19:
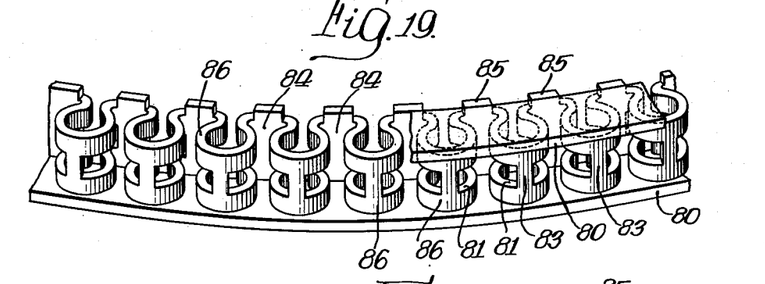
Fig. 19 is a perspective view of a ring assembly utilizing the combined expander and positioning member made from the strip shown in Fig. 18.
Figure 20:
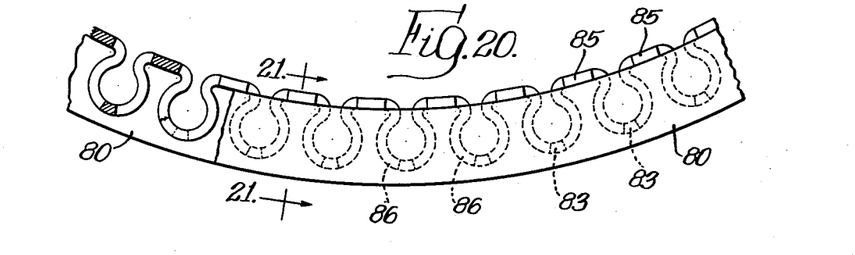
Fig. 20 is a fragmentary plan view of the ring assembly shown in Fig. 19.
Figure 21:
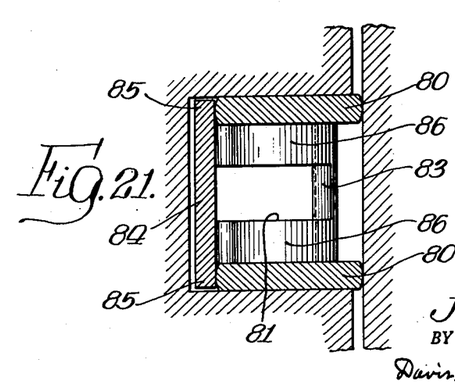
Fig. 21 is an enlarged transverse sectional view taken on the line 21—21 of Fig. 20 and showing the ring assembly in relation to the piston and cylinder.

In this embodiment of the invention, the combined spacer and expander is also formed from a strip of sheet metal but is punched and bent in quite a different manner from the forms heretofore described. Thus, as shown in Fig. 18, the strip of metal is provided with a series of centrally located longitudinally extending slots 81, leaving two rows of longitudinally extending side bars 82, with the side bars in one row connected to those in the other row intermediate their ends by cross members 83. The side bars, at their ends, are connected by supporting members 84 extending transversely of the side bars to connect the side bars in each series longitudinally of the strip, as well as to connect the two series transversely of the strip. The supporting members 84 also extend laterally beyond the side bars 82, as at 85. The side bars 82 are then bowed outwardly from the supporting members 84 to form loops 86 adapted to lie between the two rails to hold the latter in axially spaced relation. The loops 86 are axially supported at the inner periphery of the ring by the supporting members 84 and at their outer portions by cross members 83.

With this structure, the loops are so arranged as to tend to open up and thus to expand the combined spacer and expander circumferentially while supporting the rails 80 in axially spaced relation. To utilize the expansive force exerted by the loops 86, the end portions 85 of the supporting members 84 extending above and below the loops, when assembled with the rails in a piston ring groove, engage the rails at their inner peripheries. Thus, the circumferentially expansive force exerted by the loops will cause the portions 85 of the supporting members to bear outwardly against the rails and hold them in engagement with the cylinder wall. The combined spacer and expander is of a self-expanding character and does not rely on contact with the back of the ring groove to exert an outward force on the rails. Also, the points of bearing between the portions 85 and the rails are so closely spaced that a substantially uniform outward pressure is exerted against the rails throughout their inner peripheries. The rails thus will bear evenly against the cylinder wall without producing undue wear at spaced points about the circumference.

I claim:

1. A piston ring assembly comprising a cylinder-engaging rail, and a combined expanding and positioning member comprising a row of segments engaging the inner periphery of the rail, and circumferentially expansible means connecting said segments for expanding the rail, said means bearing axially against the rail to hold it at one side of the piston ring groove.

2. A piston ring assembly comprising a cylinder-engaging rail, and a combined expanding and positioning member comprising a row of segments engaging the inner periphery of the rail and interconnected by circumferentially expansible means comprising web members bearing axially against the rail for holding it at one side of the piston ring groove.

3. A piston ring assembly comprising a cylinder-engaging rail, and a combined expanding and positioning member comprising a row of segments engaging the inner periphery of the rail, and circumferentially spaced web members connected at one end to said segments and interconnected in pairs at their other ends with the pairs disconnected from each other except by the segments, said web members bearing axially against the rail for holding it at one side of the piston ring groove.

4. A piston ring assembly comprising a cylinder-engaging rail, and a combined expanding and positioning member comprising a strip of sheet metal bent on lines extending longitudinally of the strip and transversely slotted to form a self-expansible structure bearing axially against the rail to hold it at one side of the piston ring groove with one edge portion of the strip bent to engage the inner periphery of the rail.

5. A piston ring assembly comprising a cylinder-engaging rail, and a combined expanding and positioning member comprising a strip of sheet metal bent on lines extending longitudinally of the strip and having transverse overlapping slots extending alternately from opposite edges of the strip to form two circumferentially extending rows of segments connected by transversely extending web members, the web members bearing axially against the rail to hold it at one side of the piston ring groove, and one row of segments bearing against the inner periphery of the rail.

6. A combined expanding and positioning member for use with a cylinder-engaging rail, said member comprising a row of segments adapted to bear radially outwardly against the rail, and a circumferentially self-expansible structure connecting the segments and adapted to bear axially against the rail to position it at one side of the piston ring groove.

7. A combined expanding and positioning member for use with a cylinder-engaging rail, said member comprising a strip of sheet metal transversely slotted alternately from opposite edges of the strip to form a plurality of web members connecting two rows of segments formed by the respective edge portions of the strip, the web members being bent into a structure adapted to bear axially against the rail to position it at one side of the piston ring groove and one row of segments being adapted to engage the inner periphery of the rail for expanding it radially.

8. A piston ring assembly comprising a pair of rails, and a combined spacer and expander comprising axially spaced rows of segments bearing outwardly against the rails and connected by circumferentially expansible means comprising web members extending between the rails and holding them in axially spaced relation.

9. A piston ring assembly comprising a pair of rails, and a combined spacer and expander comprising a circumferentially self-expanding element bearing outwardly against the inner periphery of the rails and having portions extending between the rails for holding them in axially spaced relation.

10. A piston ring assembly comprising a pair of rails, and a combined spacer and expander comprising a circumferentially self-expansible structure positioned between the rails for holding them in axially spaced relation and having portions extending axially and engaging the inner peripheries of the rails.

11. A piston ring assembly comprising a pair of rails, and a combined spacer and expander comprising a strip of sheet metal bent on lines extending longitudinally of the strip and transversely slotted to form a self-expansible structure positioned between the rails for holding them in axially spaced relation with the edge portions of the strip bent to engage the inner peripheries of the rails.

12. A piston ring assembly comprising a pair of rails, and a combined spacer and expander comprising a strip of sheet metal bent on lines extending longitudinally of the strip and having transverse slots extending alternately from opposite edges of the strip to form two circumferentially extending rows of segments connected by transversely extending web members positioned between the rails for holding them in axially spaced relation, the segments being bent on lines extending parallel to the edges of the strip to engage the inner peripheries of the rails.

13. A piston ring assembly comprising a pair of axially spaced rails, and a circumferentially self-expanding combined spacer and expander comprising a U-shaped element positioned wholly between the rails and having portions extending axially and oppositely from the ends of the arms of the U and engaging the inner peripheries of the rails.

14. A piston ring assembly comprising a pair of rails, and a combined spacer and expander comprising a strip of sheet metal having transverse slots extending alternately from opposite edges of the strip to form two circumferentially extending rows of segments connected by transversely extending web members, said web members being bent into a U-shape form and being positioned between the rails to hold them in axially spaced relation, said segments extending inwardly of the rails and being bent to extend axially to engage the inner peripheries of the rails.

15. A combined spacer and expander element for use with a pair of rails to form a piston ring assembly, said element comprising two rows of segments connected by web members, the latter being connected only by said segments and being bent into a U-shape for holding the rails in axially spaced relation and the segments being bent for engagement with the inner peripheries of the rails.

16. A combined spacer and expander element for use with a pair of rails to form a piston ring assembly, said element comprising two circumferentially extending rows of segments at the inner periphery of the element adapted to engage the inner peripheries of the rails, and a circumferentially self-expansible structure connecting the two rows of segments and extending outwardly therefrom.

17. A combined spacer and expander element for use with a pair of rails to form a piston ring assembly, said element comprising two rows of segments, each segment being in the form of a right angle in cross section with one leg of the angle adapted to engage the periphery of the rail, and circumferentially expansible means extending from the other leg of each segment for connecting the segments of the two rows together.

18. A piston ring assembly comprising a cylinder-engaging rail, and a combined expanding and positioning member for expanding the rail radially and for holding the rail at one side of the ring groove in the piston, said member comprising a row of segments interconnected by a circumferentially expansible web structure bearing axially against the rail for holding it at one side of the piston ring groove, each segment having a flange portion engaging the inner periphery of the rail with the ends of the flange portion curved inwardly out of contact with the rail to facilitate relative sliding movement between the flange portion and the rail upon expansion and contraction of the ring.

19. A piston ring assembly comprising a pair of cylinder-engaging rails, and a combined spacer and expander member for expanding the rails radially and for holding the rails in axially spaced relation, said member comprising two rows of segments connected by circumferentially spaced web members bearing axially against the rails, each segment having a flange portion engaging the inner periphery of one of the rails with the ends of the flange portion curved inwardly out of contact with the rail to facilitate relative sliding movement between the flange portion and the rail upon expansion and contraction of the ring.

20. A piston ring assembly comprising a pair of cylinder-engaging rails, and a combined spacer and expander member for expanding the rails radially and for holding the rails in axially spaced relation, said member comprising two rows of segments connected by circumferentially spaced web members bearing axially against the rails, each segment having a flange portion engaging the inner periphery of one of the rails, the flange portion being of greater circumferential length than the segment and having its ends curved inwardly out of contact with the rail to facilitate relative sliding movement between the flange portion and the rail upon expansion and contraction of the ring.

21. A piston ring assembly comprising a pair of cylinder-engaging rails, and a combined spacer and expander member for expanding the rails radially and for holding the rails in axially spaced relation, said member comprising a strip of sheet metal folded on longitudinal lines and having transverse slots in staggered relation providing two rows of segments connected by web members, the segments in each row being circumferentially spaced from each other by alternate slots and each segment having a flange portion bearing against the inner periphery of one rail and projecting circumferentially at its ends beyond the segment, the ends of each flange portion being curved inwardly out of contact with the rail to facilitate relative sliding movement between the flange portion and the rail upon expansion and contraction of the ring.

22. A piston ring assembly comprising a pair of cylinder-engaging rails, and a combined spacer and expander member for expanding the rails radially and for holding the rails in axially spaced relation, said member comprising a strip of sheet metal folded on longitudinal lines and having slots extending transversely of the strip alternately from opposite edges of the strip and providing two rows of segments connected by web members, each segment having a flange portion bearing against the inner periphery of one of the rails and having a pair of notches extending from the slots at the respective sides of the segment and located at the juncture of the flange portion with the segment to provide detached ends on the flange portion, said ends being curved inwardly out of contact with the rail to facilitate relative sliding movement between the rail and flange portion upon expansion and contraction of the ring.

23. A piston ring assembly comprising a pair of cylinder-engaging rails, and a combined spacer and expander member for expanding the rails radially and for holding the rails in axially spaced relation, said member comprising a strip of sheet metal folded on longitudinal lines and having slots of uniform width extending transversely of the strip alternately from opposite edges of the strip and providing two rows of circumferentially spaced segments connected by web members, each segment having an edge portion bent to extend axially and bearing against the inner periphery of one of the rails.

24. A piston ring assembly comprising a cylinder-engaging rail, and a combined expanding and positioning element for expanding the rail radially and for holding the rail at one side of the ring groove in the piston, said element comprising two rows of segments connected by web members, one row of segments extending axially and bearing outwardly against the inner periphery of the rail and the other row of segments extending radially and adapted to engage the cylinder.

25. A piston ring assembly comprising a cylinder-engaging rail, and a combined expanding and positioning element for expanding the rail radially and for holding the rail at one side of the ring groove in the piston, said element comprising a strip of sheet metal transversely slotted to provide two rows of segments at the respective edges of the strip and circumferentially spaced web members connecting the rows of segments, said strip being folded along longitudinal lines so that the segments of one row extend axially and bear radially against the rail and the segments of the other row extend radially to engage the cylinder, the web members bearing axially against the rail to hold it at one side of the ring groove in the piston.

26. A piston ring assembly comprising a pair of cylinder-engaging rails, and a combined spacer and expander member for expanding the rails radially and for holding the rails in axially spaced relation, said member comprising a series of circumferentially spaced radially extending loops located between the rails for holding them in axially spaced relation, and connecting portions each bearing radially throughout its circumferential length against the inner peripheries of the rails.

27. A piston ring assembly comprising a pair of cylinder-engaging rails, and a combined spacer and expander member for expanding the rails radially and for holding the rails in axially spaced relation, said member comprising a strip of sheet metal bent to provide a series of pairs of axially spaced loops extending outwardly between the two rails for holding the respective rails in axially spaced relation, the portions of the strip between the loops connecting the pairs of loops and the loops of each pair and extending axially above and below the loops and bearing radially against the inner peripheries of the rails.

28. A piston ring assembly comprising a pair of cylinder-engaging rails, and a combined spacer and expander member for expanding the rails radially and for holding the rails in axially spaced relation, said member comprising a strip of sheet metal punched and bent to provide two series of loops axially spaced from each other and located between the rails with one series of loops bearing axially against one rail and the other series of loops bearing axially against the other rail to hold the rails in axially spaced relation, the loops of each series being integrally connected at the outer ends to the loops in the other series to hold the two series of loops rigid with each in an axial direction, the portions of the strip between the loops and connecting the loops circumferentially extending axially above and below the respective series of loops and bearing radially against the inner peripheries of the rails.

JOHN F. SHIRK.

References Cited in the file of this patent

UNITED STATES PATENTS

| Number | Name | Date |
|---|---|---|
| 1,708,816 | Williams | Apr. 9, 1929 |
| 2,220,947 | Paton | Nov. 12, 1940 |
| 2,229,578 | Malpas | Jan. 21, 1941 |
| 2,231,801 | Cords | Feb. 11, 1941 |
| 2,236,721 | Teetor | Apr. 1, 1941 |
| 2,287,707 | Phillips | June 23, 1942 |
| 2,296,332 | Bowers | Sept. 22, 1942 |
| 2,309,477 | Phillips | Jan. 26, 1943 |
| 2,349,903 | Fall | May 30, 1944 |
| 2,390,044 | Bowers | Dec. 4, 1945 |